United States Patent
Balinsky et al.

(10) Patent No.: US 9,444,628 B2
(45) Date of Patent: Sep. 13, 2016

(54) PROVIDING DIFFERENTIAL ACCESS TO A DIGITAL DOCUMENT

(75) Inventors: Helen Balinsky, Bristol (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 13/810,714

(22) PCT Filed: Sep. 21, 2010

(86) PCT No.: PCT/US2010/049638
§ 371 (c)(1),
(2), (4) Date: Jan. 17, 2013

(87) PCT Pub. No.: WO2012/039703
PCT Pub. Date: Mar. 29, 2012

(65) Prior Publication Data
US 2013/0246799 A1    Sep. 19, 2013

(51) Int. Cl.
*H04L 9/32* (2006.01)
*G06F 21/62* (2013.01)

(52) U.S. Cl.
CPC ......... *H04L 9/3247* (2013.01); *G06F 21/6209* (2013.01)

(58) Field of Classification Search
CPC .............................. H04L 9/3252; H04L 9/3066
See application file for complete search history.

(56) References Cited

U.S. PATENT DOCUMENTS

| | | | | |
|---|---|---|---|---|
| 5,912,969 A | * | 6/1999 | Sasamoto | H04N 5/913 348/E7.056 |
| 6,229,894 B1 | * | 5/2001 | Van Oorschot | G06F 21/6209 709/229 |
| 2002/0091927 A1 | | 7/2002 | Wall | |
| 2003/0217264 A1 | | 11/2003 | Martin et al. | |
| 2006/0047977 A1 | | 3/2006 | Hanasaki | |
| 2009/0100267 A1 | * | 4/2009 | Brown | H04L 9/3066 713/176 |
| 2009/0150761 A1 | | 6/2009 | Sawicki et al. | |
| 2010/0043070 A1 | * | 2/2010 | Okada | G06F 21/6209 726/21 |
| 2010/0046749 A1 | | 2/2010 | Hatano et al. | |

FOREIGN PATENT DOCUMENTS

| | | |
|---|---|---|
| CN | 101706825 | 5/2010 |
| JP | 2005184222 A | 7/2005 |
| WO | PCT-2004/057796 | 7/2004 |

* cited by examiner

*Primary Examiner* — Arvin Eskandarnia
(74) *Attorney, Agent, or Firm* — Mannava & Kang, P.C.

(57) ABSTRACT

In a method for providing differential access to a digital document among workflow participants, in which at least one of the workflow participants is outside of a common secure environment (300), a first set of keys including an encryption key, a signature key, and a verification key is associated with atomic unit(s) (304). The atomic unit(s) is encrypted using the encryption key and signed using the signature key (306, 308). A level of access to the atomic unit(s) to be granted to each of the workflow participants and the keys in the first set of keys to supply to each of the workflow participants based upon the identified level of access are identified (310, 312). In addition, each of the workflow participants is supplied with the identified one or more keys (314) and the encrypted and signed atomic unit(s) is supplied to a first workflow participant (316).

15 Claims, 5 Drawing Sheets

PROVIDING DIFFERENTIAL ACCESS TO A DIGITAL DOCUMENT

CROSS REFERENCE TO RELATED APPLICATIONS

The present application contains common subject matter copending and commonly assigned PCT application Ser. No. 13/810,714, entitled "Application of Differential Policies to at Least One Digital Document", filed on the same date herewith, the disclosure of which is hereby incorporated by reference in its entirety.

BACKGROUND

In recent years, there has been a growing trend to move away from printing information on paper toward the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may easily be counterfeited.

Various techniques have been proposed to prevent or reduce attacks and counterfeiting of digital documents. These techniques typically employ a database upon which the digital documents are stored and access to the database, or a network to which the database is connected, is controlled by preventing access to the database or network to a user unless that user possesses some secret information, such as, a user identification and password. As such, in order for these security techniques to enforce access control on the digital documents, users are required to be granted access to the database or network. However, access to the database or network is typically prohibited or undesirable for various security reasons, such as, to prevent access by contractors or non-employees of the corporate or government entity that owns the database or network. Often, for simplicity and compliance purposes, access control is provided in whole or not at all.

BRIEF DESCRIPTION OF THE DRAWINGS

Features of the present invention will become apparent to those skilled in the art from the following description with reference to the figures, in which.

DETAILED DESCRIPTION

Figure 1:
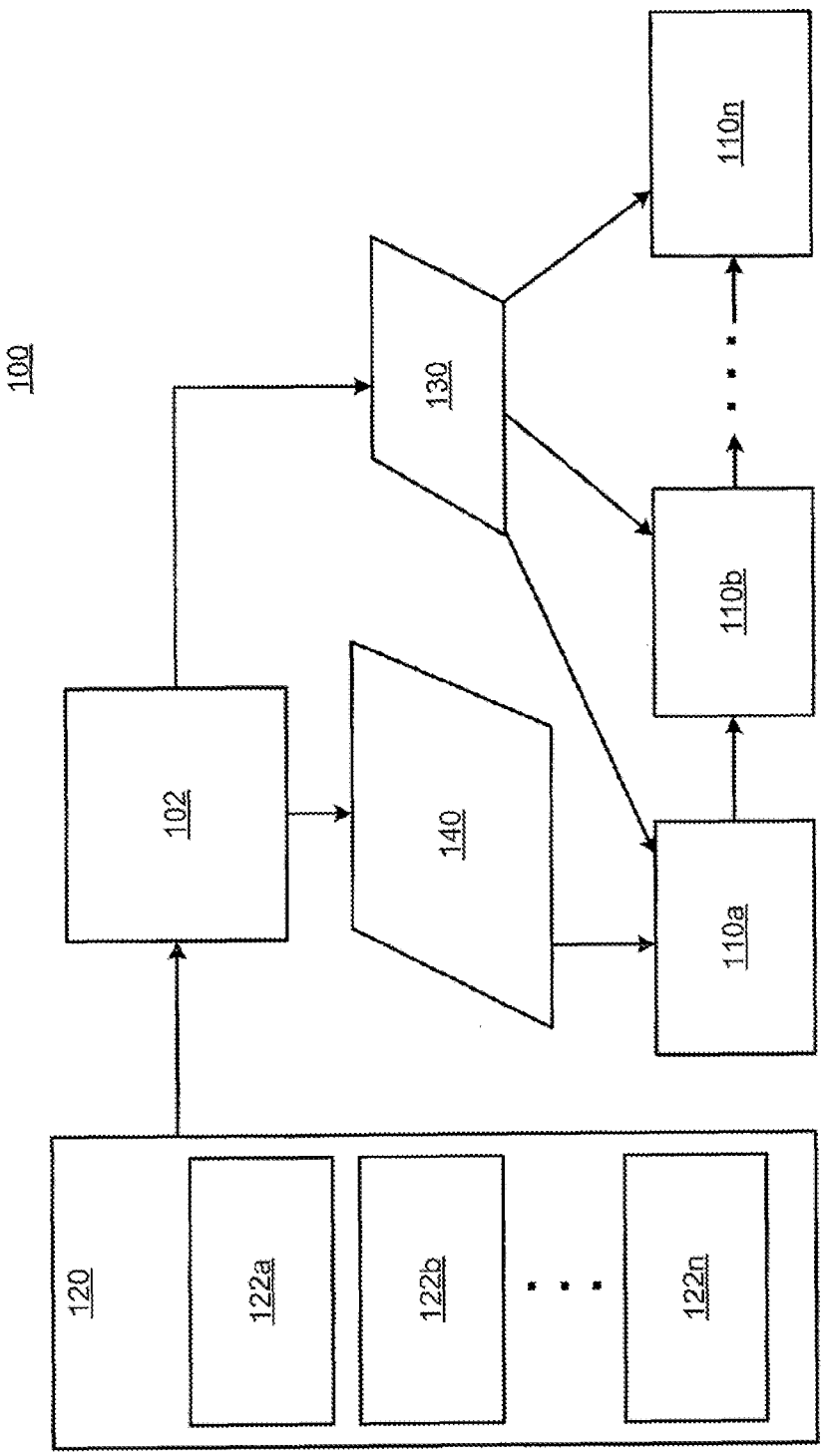
FIG. 1 illustrates a simplified schematic diagram of a digital document workflow, according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a method and apparatus for providing differential access to a digital document among a plurality of workflow participants, in which at least one of the workflow participants is outside of at least one of a common and a uniformly-secure environment. In other words, for instance, multiple users may be accessing the document in environments with different levels of security. The digital document may comprise a composite document, which is composed of a variety of individual addressable and accessible parts (units) in the form of separate files or addressable file fragments. For example, the units may include html fragments, xml nodes, presentation slides, word processing text boxes, parts of a spreadsheet document, an electronic object containing drawings, an electronic object having flash video capabilities, etc. The individual addressable and accessible parts are recited as "atomic unit" throughout the present disclosure. In addition, the atomic units of a particular digital document may comprise the same format or different formats from each other.

As also disclosed herein, differential access to a digital document, or to one or more of the atomic units contained in the digital document, by the workflow participants may be provided through control of the types of and numbers keys supplied to each of the workflow participants for the digital documents or the one or more atomic units contained in the digital document. In one regard, therefore, the differential levels of access granted to the workflow participants may be provided and enforced in a relatively simple and inexpensive manner.

Throughout the present disclosure, the term "n" following a reference numeral is intended to denote an integer value that is greater than 1. In addition, the terms "a" and "an" are intended to denote at least one of a particular element.

With reference first to FIG. 1, there is shown a simplified diagram of a digital document workflow 100, according to an embodiment of the present invention. It should be apparent to those of ordinary skill in the art that the diagram depicted in FIG. 1 represents a generalized illustration and that other components may be added or existing components may be removed, modified or rearranged without departing from a scope of the digital document workflow 100.

The digital document workflow 100 is depicted as including a differential access control apparatus 102 and a plurality of workflow participants 110*a*-110*n*. The digital document workflow 100 is also depicted as including a digital document 120 containing a plurality of atomic units 122a-122n. Generally speaking, the differential access control apparatus 102 is configured to differentially control access to one or more of the atomic units 122a-122n in the digital document 120 by each of the workflow participants 110a-110n through controlled distribution of keys to access the atomic units 122a-122 to each of the workflow participants 110a-110n.

The differential access control apparatus 102 may comprise a hardware device, such as, a computer, a server, a circuit, etc., configured to perform various functions in differentially controlling access to the atomic units 122a-122n. The various functions that the differential access control apparatus 102 performs are discussed in greater detail hereinbelow.

The workflow participants 110a-110n generally represent computing devices through which the workflow participants 110a-110n may receive, and when granted sufficient access, to at least one of view, edit, and acknowledge one or more of the atomic units 122a-122n. The computing devices may comprise, for instance, personal computers, laptop computers, tablet computers, personal digital assistants, cellular telephones, etc.

According to an embodiment, the differential access control apparatus 102 is in a secure environment where the digital document owner/creator/master has access to the workflow control apparatus 102 and some or all the computing devices of the workflow participants 110a-110n are outside of the secure environment. In other words, some or all of the workflow participants 110a-110n may not access the digital document 120 from a common database that controls access to the digital document 120. Instead, the digital document 120 is supplied to and among the workflow participants 110a-110n through, for instance, e-mail, a shared server, direct file transfer, removable storage medium, etc. Some or all of the workflow participants 110a-110n may not be granted access to the secure environment of the workflow control apparatus 102 in instances where such access is impractical or prohibited.

The digital document 120 may comprise any reasonably suitable type of a document in a digital form and may comprise one or more digital documents, which may be in the same or different formats with respect to each other. Examples of suitable document types include, for instance, portable document format, spreadsheet, JPEG or any other image, word processing document, hypertext markup language (html), etc. In addition, the atomic units 122a-122n generally comprise individual addressable elements within the digital document 120, such as, signature lines, cells or columns within a spreadsheet, paragraphs, graphics boxes, etc. As discussed in greater detail herein below, the differential access control apparatus 102 is configured to identify the differential access levels to be granted to each of the workflow participants 110a-110n and to identify (select) and (optionally) supply one or more keys 130 to the workflow participants 110a-110n based upon the determined access levels. In addition, the differential access control apparatus 102 is configured to generate (or derive) needed encryption and signature keys, encrypt and sign the one or more atomic units 122a-122n of the digital document 120 and to supply the encrypted and signed document 140 to a first workflow participant 110a.

In addition, the digital document 120 is configured to be supplied by the first workflow participant 110a to a second workflow participant 110b, for instance, by the first workflow participant e-mailing the digital document to the second participant or by mailing a CD containing the digital document, etc., by the second workflow participant 110b to a third workflow participant 110c, and so forth. Alternatively, the digital document 120 may be retrieved by the workflow participants 110a-110n. According to an example, the order in which the digital document 120 is supplied between at least some of the workflow participants 110a-110n is predetermined. In another example, the order in which the workflow participants 110a-110n access the digital document 120 may not be predetermined. In addition, because the differential access control apparatus 102 may be inside of some secure environment of a document master/owner/creator and at least some of the workflow participants 110a-110n are outside of the common secure environment, the differential access control apparatus 102 need not be involved in the supply and/or retrieval of the digital document 120 by the workflow participants 110b-110n following the first communication of the encrypted and signed document 140 to the first workflow participant 110a.

Figure 2:
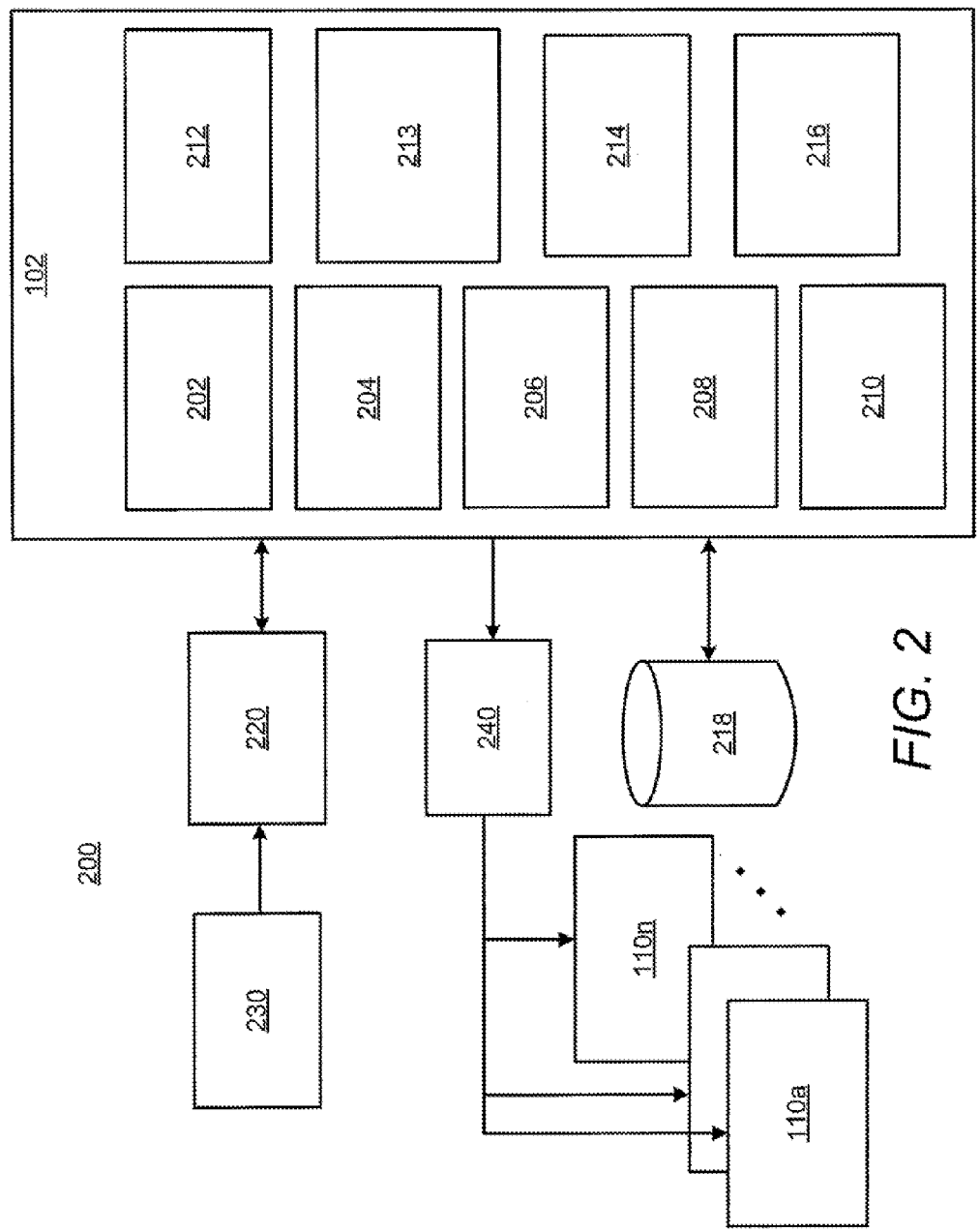
FIG. 2 shows a simplified block diagram of a differential access providing system containing the differential access control apparatus depicted in FIG. 1, according to an embodiment of the present invention.

With particular reference now to FIG. 2, there is shown a simplified block diagram of a differential access providing system 200 containing the differential access control apparatus 102 depicted in FIG. 1, according to an example. It should be apparent to those of ordinary skill in the art that the block diagram depicted in FIG. 2 represents a generalized illustration and that other components may be added or existing components may be removed, modified or rearranged without departing from a scope of the differential access providing system 200.

As shown in FIG. 2, the differential access control apparatus 102 includes a user interface module 202, a key association module 204, an encryption module 206, a signing module 208, an access level identification module 210, a key identification module 212, a key generation/derivation module 213, a key supplying module 214, and a digital document supplying module 216. The modules 202-216 may comprise software modules, hardware modules, or a combination of software and hardware modules. Thus, in one embodiment, one or more of the modules 202-216 comprise circuit components. In another embodiment, one or more of the modules 202-216 comprise software code stored on a computer readable storage medium, which is executable by a processor.

In any regard, the differential access control apparatus 102 is configured to be implemented and/or executed by a processor 220. Thus, for instance, the differential access control apparatus 102 may comprise an integrated and/or add-on hardware device of a computing device comprising the processor 220. As another example, the differential access control apparatus 102 may comprise a computer readable storage device upon which software for each of the modules 202-214 is stored and executed by the processor 220.

As further shown in FIG. 2, the processor 220 is configured to receive input from an input apparatus 230. The input apparatus 230 may comprise, for instance, a user interface through which a user may supply digital documents 120 into the differential access control apparatus 102. The input apparatus 230 may also comprise a user interface through which a user may define access levels to be granted to one or more of the atomic units 122a-122n to each of the workflow participants 110a-110n. In any regard, the processor 220 is configured to execute or implement the differential access control apparatus 102 to differentially control access to the one or more of the atomic units 122a-122n by the workflow participants.

The differential access providing system 200 also includes an output interface 240 through which keys 130 and the encrypted and signed document 140 may be supplied to one or more of the workflow participants 110a-110n. There are different mechanisms through which keys may be distributed to the corresponding workflow participants. Non-exhaustive examples of these different mechanisms include:

1) The appropriate keys 130 may be e-mailed (in encrypted form) directly to each workflow participant 110a-110n by the document master/author/creator.

2) The workflow participants 110a-110n may be required to login to a cloud-base service where the keys 130 are stored to retrieve the appropriate keys 130.

3) The appropriate keys 130 may stored on removable storage media, such as, compact disks, portable thumb drives, etc., in encrypted or unencrypted form and distributed to the workflow participants 110a-110n manually.

4) The workflow participants 110a-110n may already be in possession of the appropriate keys 130 from a previous use.

5) The appropriate keys 130 may be contained within the digital document itself. A more detailed discussion of this example is discussed in U.S. patent application Ser. No. 13/810,714.

6) The appropriate keys may be accessed through a security proxy, including, for example, a biometric such as voice, iris, and/or fingerprint identification and validation.

The keys 130 and the signed document 140 may be stored in a data store 218 prior to delivery to the workflow participants 110a-110n. The data store 218 may comprise volatile and/or non-volatile memory, such as DRAM, EEPROM, MRAM, phase change RAM (PCRAM), Memristor, flash memory, and the like. In addition, or alternatively, the data store 218 may comprise a device configured to read from and write to a removable media, such as, a floppy disk, a CD-ROM, a DVD-ROM, or other optical or magnetic media.

Figure 3:
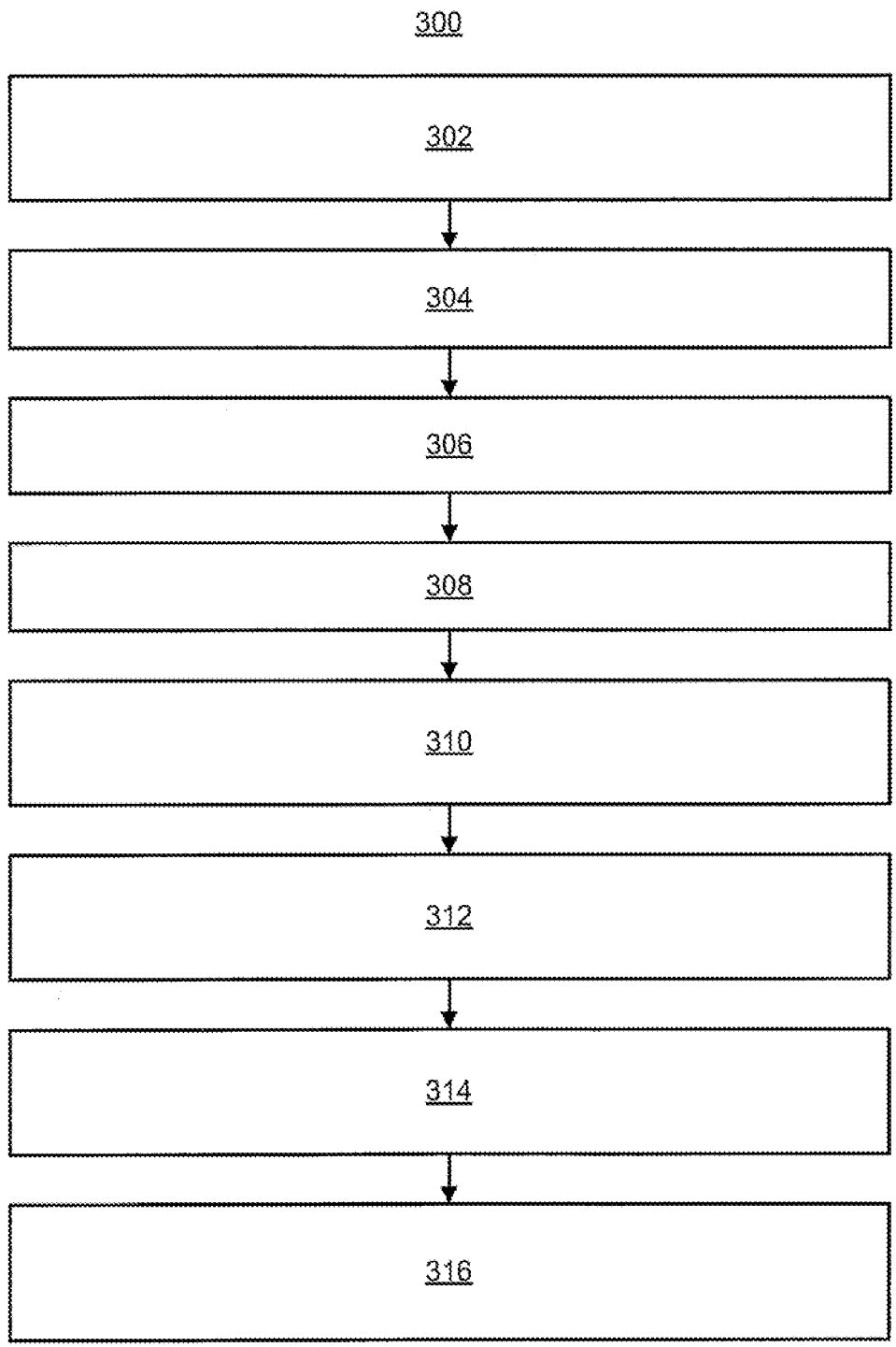
FIG. 3 shows a flow diagram of a method for providing differential access to a digital document among a plurality of workflow participants, in which at least one of the workflow participants is outside of a common secure environment, according to an embodiment of the present invention.

Various manners in which the modules 202-216 of the differential access control apparatus 102 may be implemented are described in greater detail with respect to FIG. 3, which depicts a flow diagram of a method 300 for providing differential access to a digital document among a plurality of workflow participants 110a-110n, in which at least one of the plurality of workflow participants 110a-110n is outside of a common secure environment, according to an embodiment of the invention. It should be apparent to those of ordinary skill in the art that the method 300 represents a generalized illustration and that other steps may be added or existing steps may be removed, modified or rearranged without departing from a scope of the method 300.

The description of the method 300 is made with particular reference to the differential access control apparatus 102 depicted in FIGS. 1 and 2. It should, however, be understood that the method 300 may be implemented in an apparatus that differs from the differential access control apparatus 102 without departing from the scope of the method 300.

At step 302, a digital document 120 that is to be placed into a workflow among a plurality of workflow participants 110a-110n is accessed. For instance, the differential access control apparatus 102 receives the digital document 120 from the input apparatus 230 through the user interface module 202. As another example, a user instructs the differential access control apparatus 102 to access the digital document 120 from, for instance, the data store 214. As another example, a new digital document 120 is created from a template, such as, for instance, an application form process.

At step 304, a first set of keys is associated with at least one of the atomic units 122a-122n, for instance, by the key association module 204. The first set of keys includes an encryption key, or alternatively a pair of encryption-decryption keys, and a pair of a signature and a verification keys. In addition, although not explicitly shown in FIG. 3, one or more additional sets of keys may be associated with one or more of the other atomic units 122a-122n. Thus, for instance, a sets of keys may be associated with each of the atomic units 122a-122n. In addition, for one or more of the atomic units 122a-122n that contain no sensitive or private material, the set of keys may only include a signature—verification pair. Moreover, the first set of keys may be associated with a plurality of atomic units 122a-122n to, for instance, grant the same level of access to each of the plurality of atomic units 122a-122n associated with the first set of keys to a workflow participant 110a.

At step 306, the one or more atomic units 122a-122n are encrypted using one or more encryption keys, for instance, by the encryption module 206. The one or more atomic units 122a-122n may use any standard or proprietary encryption mechanism, such as, for instance, symmetric AES encryption, Twofish encryption, asymmetric RSA, etc. According to an embodiment, each of the atomic units 122a-122n that are to be provided with differential access levels may be encrypted using respective specially generated, derived and/or assigned encryption key.

At step 308, the one or more encrypted atomic units 122a-122n are signed using one or more signature keys, for instance, by the signing module 208. The one or more encrypted atomic units 122a-122n may be signed, for example, through use of a Digital Signature Algorithm, RSA based signatures, etc. According to an embodiment, each of the atomic units 122a-122n that have been encrypted is signed using a specially assigned, generated or derived signature key.

According to an embodiment, prior to performance of steps 304-308, a determination of which of the one or more atomic units 122a-122n are to be encrypted for various levels of access to be granted to each of the workflow participants may be consulted to determine which of the atomic units 122a-122n require differential access. As such, a determination as to which of the atomic units 122a-122n are to be encrypted may be made prior to steps 304-308.

At step 310, access levels to the one or more atomic units 122a-122n to be granted to each of the workflow participants 110a-110n are identified, for instance, by the access level identification module 210. More particularly, for instance, the access level identification module 210 may track instructions received through the user interface module 202 from the input apparatus 230 that identify the workflow participants 110a-110n that are to receive the digital document 120 as well as the differential access rights to be granted to each of the workflow participants 110a-110n to the one or more atomic units 122a-122n, In addition, the access level identification module 210 may store the information received from the input apparatus 230 in the data store 218. In another example, access levels to be granted to the one or more atomic units 122a-122n may be stored in the data store 218 and the access level identification module 210 may access the data store 218 to retrieve the access level information.

According to an example, the workflow participants 110a-110n may be granted one of a "no access" level, a "read only access" level, and a "modify access" level to each of the one or more atomic units 122a-122n. As such, for instance, a workflow participant 110a may be granted different levels of access to the atomic units 122a-122n contained in an encrypted and signed digital document 140. In addition, a first workflow participant 110a may be granted a different level of access to one or more of the atomic units 122a-122n than a second workflow participant 110b.

For atomic units 122a-122n under the "no access" level, a workflow participant 110a is granted the ability to receive one or more of the atomic units 122a-122n, but is not granted the ability to open or otherwise read or modify these atomic units. As such, for instance, the workflow participant 110a-110n may access the digital document 120 containing the atomic units 122a-122n to which the workflow participant 110a has been granted the "no access" level, but may not be able to read or modify those atomic units 122a-122n. This workflow participant 110a may, however, be required to authenticate the atomic units 122a-122n to which the workflow participant 110a has been granted the no access level as well as all other ones of the atomic units 122a-122n. This situation may occur, for instance, when the workflow participant 110a has been granted access to view one or more of the atomic units 122a-122n, but has not been granted access to view other ones of the atomic units 122a-122n. The workflow participant 110a may then be required to transfer the digital document 120 to one or more subsequent workflow participants 110b-110n who may have been granted access rights to those atomic units 122a-122n that are inaccessible by the workflow participant 110a. As another example, this situation may occur for instance, when the workflow participant 110a has been granted the "no access" level to each of the atomic units 122a-122n contained in the encrypted and signed digital document 140, but has been selected to receive the appropriate keys to access the digital document 140 at a later time.

For atomic units 122a-122n under the "read only access" level, a workflow participant 110a is granted the ability to open and access the atomic units 122a-122n of the encrypted and signed digital document 140 to which the workflow participant 110a has been granted the "read only access" level. However, the workflow participant 110a is not authorized to modify those atomic units 122a-122n. In one regard, a workflow participant 110b that receives the encrypted and signed digital document 140 may determine, and must automatically verify on reception, when the atomic units 122a-122n have been modified by an unauthorized workflow participant 110a, as discussed in greater detail herein below.

For atomic units 122a-122n under the "modify access" level, a workflow participant 110a is granted the authorization to both read and modify the atomic units 122a-122n to which the workflow participant has been granted the "modify access" level. In one regard, the workflow participant 110a may be supplied with corresponding signature keys to enable the workflow participant 110a to sign some or all of the atomic units 122a-122n following modification and encryption of the atomic units 122a-122n. In addition, a second workflow participant 110b identified to receive the encrypted and signed digital document 140 from a first workflow participant 110a may have been provided with an appropriate verification key, which the second workflow participant 110b may use to determine whether the first workflow participant 110a was authorized to modify one or more of the atomic units 122a-122n. The second workflow participant 110b, if granted at least the read only access, may also be provided with an appropriate decryption key to be able to decrypt the modified atomic units 122a-122n.

At step 312, an identification of which keys 130 are to be supplied to each of the workflow participants 110a-110n for one or more of the atomic units 122a-122n is made based upon the identified level of access, for instance, by the key identification module 212. Thus, for instance, for a first atomic unit 122a, a first workflow participant 110a may be identified to receive a first set of keys 130 and a second workflow participant 110b may be determined to receive a second set of keys 130. Likewise, for a second atomic unit 122b, the first workflow participant 110a may be determined to receive a different set of keys 130 from the second workflow participant 110b, and so forth.

According to an embodiment, for those atomic units 122a-122n that workflow participants 110a-110n are to be granted the "no access" level, the key identification module 212 may determine that those workflow participants 110a-110n are to receive the verification keys for those atomic units 122a-122n without the encryption or signature keys for those atomic units 122a-122n. For those atomic units 122a-122n that workflow participants 110a-110n are to be granted the "read only access" level, the key identification module 212 may determine that those workflow participants 110a-110n are to receive the decryption keys and the verification keys, without the encryption and signature keys, for those atomic units 122a-122n. For those atomic units 122a-122n that workflow participants 110a-110n are to be granted the "modify access" level, the key identification module 212 may determine that those workflow participants 110a-110n are to receive the encryption keys, the verification keys and the signature keys for those atomic units 122a-122n.

At step 314, each of the workflow participants 110a-110n is supplied with one or more keys 130 based upon the keys 130 that have been identified to be supplied to each of the workflow participants 110a-110n at step 312, for instance, by the key supplying module 214. The key supplying module 214 may supply the keys 130 to the workflow participants 110a-110n through any suitable means, as described in greater detail hereinabove. For instance, the key supplying module 208 may supply the keys through email, through delivery of the keys in a removable storage medium, or through other secure communication channels.

At step 316, the atomic unit(s) 122a-122n are supplied to the first workflow participant 110a, for instance, by the document supplying module 216. More particularly, for instance, the document supplying module 214 may supply the digital document 140 to the first workflow participant 110a.

Figure 4:
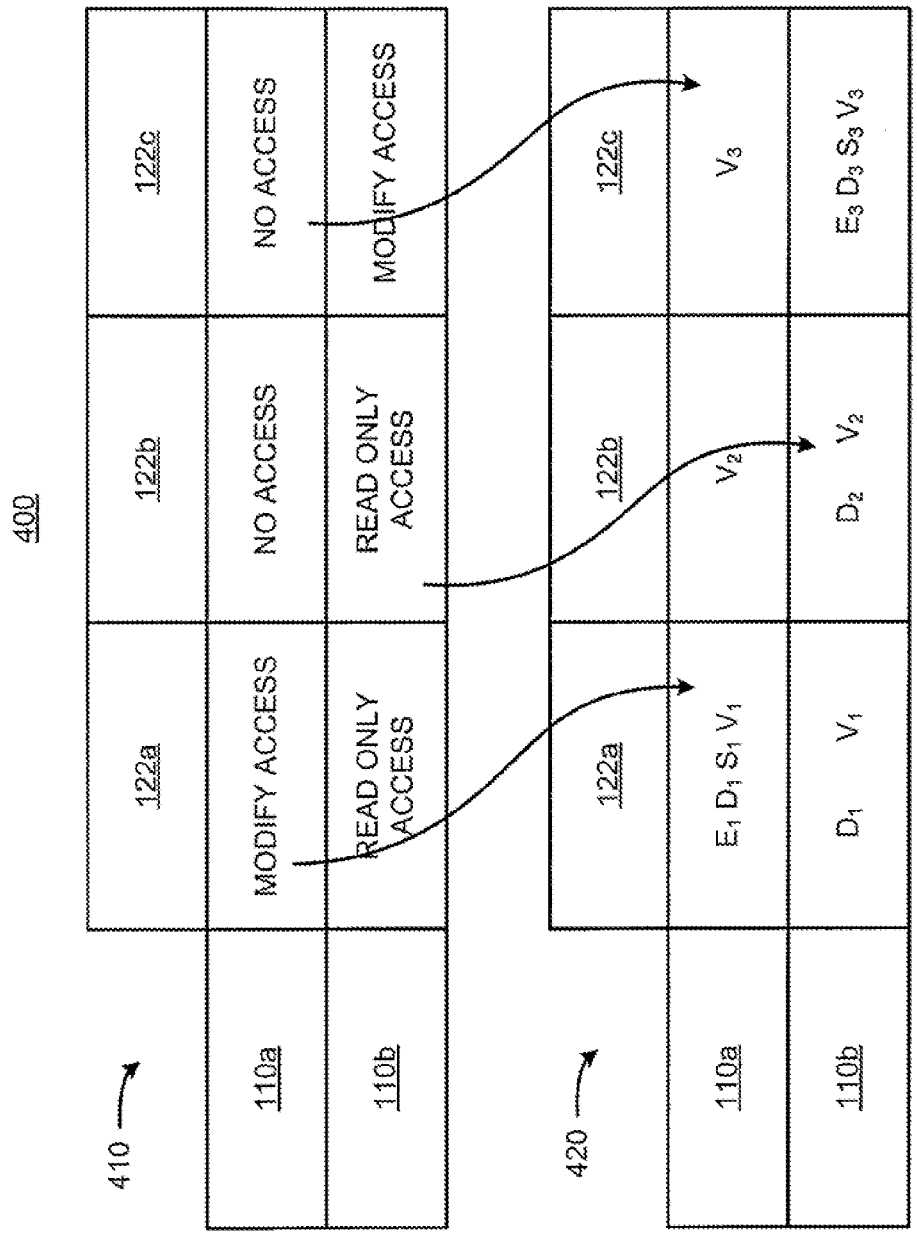
FIG. 4 shows a diagram of a manner in which differential access is provided to multiple workflow participants, according to an embodiment of the present invention.

Turning now to FIG. 4, there is shown a diagram 400 of a manner in which differential access may be provided to multiple workflow participants 110a and 110b, according to an embodiment. It should be understood that the diagram 400 is a generalized illustration and that other elements may be included therein without departing from a scope of the diagram 400. Thus, for instance, although two workflow participants 110a and 110b have been depicted in the diagram 400, it should be understood that various principles disclosed therein may be applied to any number of workflow participants 110c-110n.

The diagram 400 includes two charts 410 and 420. Both of the charts 410 and 420 depict a simple case of two workflow participants 110a and 110b and three atomic units 122a-122c. The first chart 410 depicts an example of the access levels that each of the workflow participants 110a and 110b is provided to each of the atomic units 122a-122c. The second chart 420 depicts the corresponding sets of keys supplied to the workflow participants 110a and 110b based upon the level of access that the workflow participants 110a and 110b have been granted for each of the atomic units 122a-122c. In the example depicted in FIG. 4, the first workflow participant has been granted the modify access level to the first atomic unit 122a and a no access level to the second and third atomic units 122b and 122c. In addition, the second workflow participant 110b has been granted the read only access level to the first and second atomic units 122a and 122b and the modify access level to the third atomic unit 122c.

As shown in the second chart 420, for the first atomic unit 122a, the first workflow participant 110a is supplied with encryption and decryption keys ($E_1$, $D_1$) and the signature and verification keys ($S_1$, $V_1$) for that atomic unit 122a. In addition, the second workflow participant 110b is supplied with just the decryption and verification keys ($D_1$, $V_1$) for the first atomic unit 122a. For the second and third atomic units 122b and 122c, the first workflow participant 110a is supplied with just the verification keys ($V_2$, $V_3$) for those atomic units 122b and 122c. For the second atomic unit 122b, the second workflow participant 110b is supplied with the decryption and verification keys ($D_2$, $V_2$) for that atomic unit 122b. For the third atomic unit 122c, the second workflow participant 110b is supplied with the encryption and decryption keys ($E_3$, $D_3$) and the signature and verification keys ($S_3$, $V_3$) for that atomic unit 122c.

In instances where the second workflow participant 110b is intended to access the first atomic unit 122a following modification by the first workflow participant 110a, the second workflow participant 110b is supplied with a second set of keys to be able to authenticate the modification to the at least one atomic unit 122a by the first workflow participant 110a. The second set of keys may differ from the first set of keys to thus enable the second workflow participant 110b to verify the signature of the first workflow participant 110a.

Some or all of the operations set forth in the figures may be contained as a utility, program, or subprogram, in any desired computer readable storage medium. In addition, the operations may be embodied by computer programs, which may exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
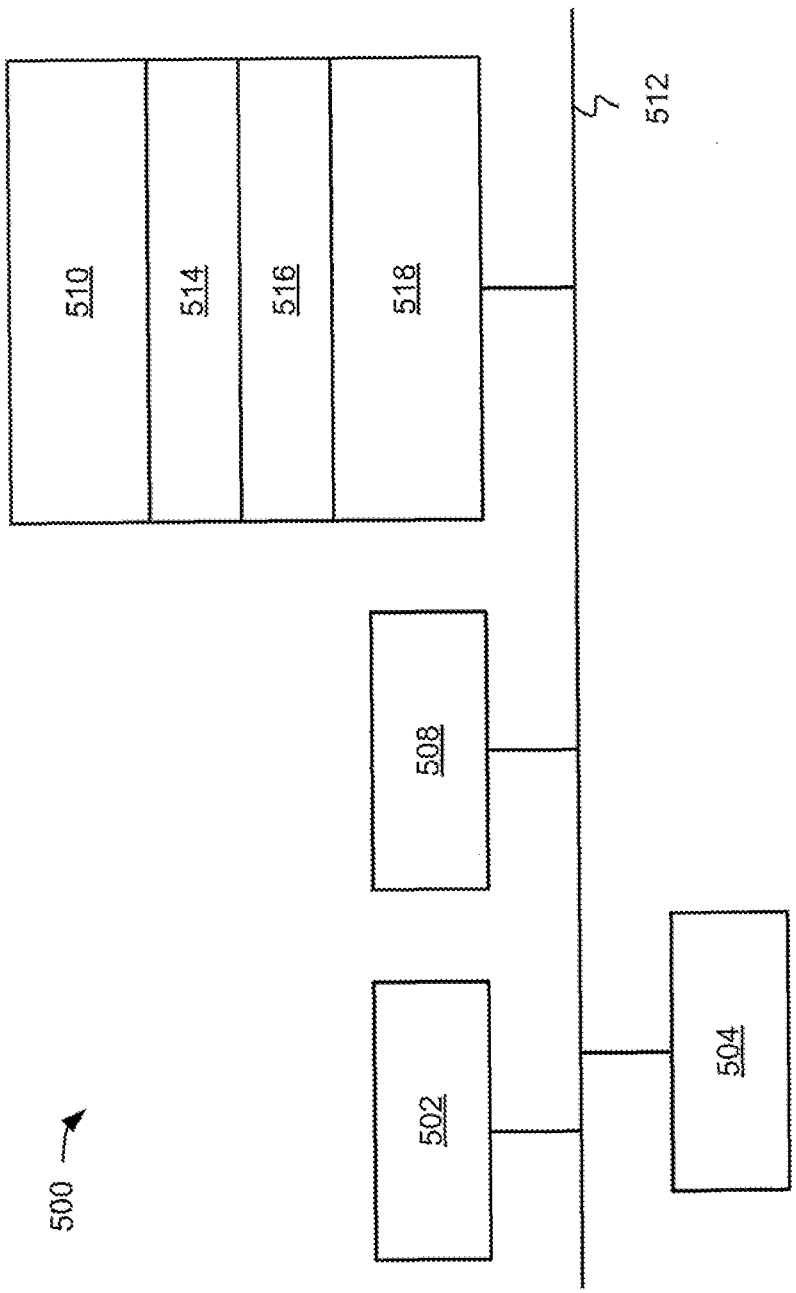
FIG. 5 shows a block diagram of a computer system that may be used as a platform for implementing or executing one or more of the processes depicted in FIG. 3, according to an embodiment of the present invention.

Turning now to FIG. 5, there is shown a schematic representation of a computing device 500 configured in accordance with embodiments of the present invention. The device 500 includes one or more processors 502, such as a central processing unit; one or more display devices 504, such as a monitor; one or more network interfaces 508, such as a Local Area Network LAN, a wireless 802.11x LAN, a 3G mobile WAN or a WiMax WAN; and one or more computer-readable mediums 510. Each of these components is operatively coupled to one or more buses 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other software applications, including word processors, browsers, email, Instant Messaging, media players, and telephony software.

The computer-readable medium 510 may also store an operating system 514, such as Mac OS, MS Windows, Unix, or Linux; network applications 516; and a differential access control application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504 and the design tool 506; keeping track of files and directories on medium 510; controlling peripheral devices, such as disk drives, printers, image capture device; and managing traffic on the one or more buses 512. The network applications 516 includes various components for establishing and maintaining network connections, such as software for implementing communication protocols including TCP/IP, HTTP, Ethernet, USB, and FireWire.

The differential access control application 518 provides various software components for controlling workflow of a digital document among a plurality of workflow participants, as described above. In certain embodiments, some or all of the processes performed by the application 518 may be integrated into the operating system 514. In certain embodiments, the processes may be at least partially implemented in digital electronic circuitry, or in computer hardware, firmware, software, or in any combination thereof.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method (300) for providing differential access to a digital document (120) among a plurality of workflow participants (110a-110n), wherein at least one of the plurality of workflow participants is outside of at least one of a common and a uniformly-secure environment, said digital document comprising at least one atomic unit (122a), said method comprising:

associating a first set of keys with the at least one atomic unit (304), said first set of keys comprising an encryption key, a signature key, and a verification key;

encrypting the at least one atomic unit using the encryption key (306);

signing the encrypted at least one atomic unit using the signature key (308);

identifying a level of access from a plurality of access levels to the at least one atomic unit to be granted to each of the workflow participants (310);

identifying which of the keys in the first set of keys to supply to each of the workflow participants based upon the identified level of access (312);

supplying each of the workflow participants with the identified one or more keys (314), wherein the encryption key enables reading, the signature key enables modification, and the verification key enables authentication of the at least one atomic unit; and supplying the encrypted and signed at least one atomic unit to a fire workflow participant of the plurality of workflow participants (316).

2. The method (300) according to claim 1, wherein supplying each of the workflow participants with the identified one or more keys (314) further comprises:

supplying the workflow participants identified to be granted a no access level to the at least one atomic unit with the verification key, while excluding the signature key and the encryption key for the at least one atomic unit;

supplying the workflow participants identified to be granted a read only access level to the at least one atomic unit with the encryption key and the verification key, while excluding the signature key for the at least one atomic unit; and supplying the workflow participants identified to be granted with the modify access level with the encryption key, the signature key, and the verification key for the at least one atomic unit.

3. The method (300) according to claim 2, wherein the encryption key comprises an asymmetric key pair of an encryption key and a decryption key, and wherein supplying the workflow participants identified to be granted the read only access level further comprises supplying the workflow participants identified to be granted the read only access level with the decryption key and the verification key (314) of the at least one atomic unit, and wherein supplying the workflow participants identified to be granted the modify access level further comprises supplying the workflow participants identified to be granted the modify access level with the encryption key, the decryption key, the signature and the verification key of the at least one atomic unit.

4. The method (300, 320) according to claim 2, wherein a first workflow participant is granted the modify access level and wherein supplying each of the workflow participants with the identified one or more keys further comprises supplying a second workflow participant of the plurality of workflow participants configured to receive the modified digital document from the first workflow participant with a second verification key configured to enable authentication of the first workflow participant's modification to the at least one atomic unit (324).

5. The method (300) according to claim 1, wherein the digital document (120) comprises a first atomic unit (122*a*) and a second atomic unit (122*b*), wherein the first atomic unit comprises the at least one atomic unit, said method further comprising:

associating a second set of keys with the second atomic unit, said second set of keys comprising a second encryption key, a second signature key, and a second verification key (304);

encrypting the second atomic unit using the second encryption key (306);

signing the encrypted second atomic unit using the second signature key (308);

identifying a first level of access from the plurality of access levels to the first atomic unit to be granted to the work tow participants (310);

identifying a second level of access from the plurality of access levels to the second atomic unit to be granted to the workflow participants, said second level of access differing from the first level of access for at least one of the workflow participants (312);

supplying each of the workflow participants with the identified one or more keys of the first set of keys and the identified one or more keys of the second set of keys depending upon the identified levels of access to be granted to the workflow participants to the first atomic unit and the second atomic unit (314); and supplying the digital document containing the encrypted and signed first atomic unit and second atomic unit to the first workflow participant (316).

6. The method (300) according to claim 5, wherein supplying each of the workflow participants with the identified one or more keys of the first set of keys and the identified one or more keys of the second set of keys further comprises supplying at least one of the workflow participants with a number of keys to access the first atomic unit that differs from a number of keys to access the second atomic unit to thereby cause the at least one workflow participant to have different levels of access to the first atomic unit and the second atomic unit (314).

7. The method (300) according to claim 5, wherein the digital document (120) comprises a plurality of atomic units (122*a*-122*n*) and wherein the first set of keys is associated with a first set of the plurality of atomic units and wherein the second set of keys is associated with a second set of the plurality of atomic units.

8. The method (300) according to claim 1, wherein identifying a level of access (310) further comprises:

identifying a first level of access to be granted to the at least one atomic unit to the first workflow participant (310);

identifying a second level of access to be granted to the atomic unit to a second workflow participant of the plurality of workflow participants (310);

supplying the first workflow participant and the second workflow participant with the identified one or more keys depending upon the determined level of access to be granted to the first workflow participant (314).

9. An apparatus (102) for providing differential access to a digital document (120) among a plurality of workflow participants (110*a*-110*n*), wherein at least one of the plurality of workflow participants is outside of at least one of a common and a uniformly-secure environment, said digital document comprising at least one atomic unit (122*a*-122*n*), said apparatus comprising:

one or modules (202-216) configured to associate a first set of keys with the at least one atomic unit, said first set of keys comprising an encryption key, a signature key, and a verification key, to encrypt the at least one atomic unit using the encryption key, to sign the encrypted at least one atomic unit using the signature key, to identify a level of access from a plurality of access levels to the at least one atomic unit to be granted to each of the workflow participants, to identify which of the keys in the first set of keys to supply to each of the workflow participants based upon the identified level of access, to supply each of the workflow participants with the identified one or more keys, wherein the encryption key enables reading, the signature key enables modification, and the verification key enables authentication of the at least one atomic unit, and to supply the encrypted and signed at least one atomic unit to a first workflow participant of the plurality of workflow participants; and a processor (220) configured to implement the one or more modules.

10. The apparatus (102) according to claim 9, wherein the one or more modules are further configured to:
- supply the workflow participants identified to be granted a no access level to the at least one atomic unit with the verification key, while excluding the signature key and the encryption key for the at least one atomic unit;
- supply the workflow participants identified to be granted a read only access level to the at least one atomic unit with the encryption key and the verification key, while excluding the signature key for the at least one atomic unit; and
- supply the workflow participants identified to be granted with the modify access level with the encryption key, the signature key, and the verification key for the at least one atomic unit.

11. The apparatus (102) according to claim 9, wherein the first workflow participant is granted the modify access level and wherein the one or more modules are further configured to supply a second workflow participant of the plurality of workflow participants configured to receive the modified digital document from the first workflow participant with a second verification key configured to enable authentication of the first workflow participant's modification to the at least one atomic unit.

12. The apparatus (102) according to claim 9, wherein the digital document (120) comprises a first atomic unit (122a) and a second atomic unit (122b), wherein the first atomic unit comprises the at least one atomic unit, said one or more modules (202-216) being further configured to:
- associate a second set of keys to the second atomic unit, said second set of keys comprising a second encryption key, a second signature key, and a second verification key;
- encrypt the second atomic unit using the second encryption key;
- sign the encrypted second atomic unit using the second signature key;
- identify a first level of access from the plurality of access levels to the first to unit to be granted to the workflow participants;
- identify a second level of access from the plurality of access levels to the second atomic unit to be granted to the workflow participants, said second level of access differing from the first level of access for at least one of the workflow participants;
- supply each of the workflow participants with the identified one or more keys of the first set of keys and the identified one or more keys of the second set of keys depending upon the identified levels of access to be granted to the workflow participants to the first atomic unit and the second atomic unit; and
- supply the digital document containing the encrypted and signed first atomic unit and second atomic unit to the first workflow participant.

13. The apparatus (102) according to claim 12, wherein the one or more modules (202-216) are further configured to supply at least one of the workflow participants with a number of keys to access the first atomic unit that differs from a number of keys to access the second atomic unit to thereby cause the at least one workflow participant to have different levels of access to the first atomic unit and the second atomic unit.

14. A computer readable ion-transitory storage medium (410) on which embedded one or more computer programs, said one or more computer programs implementing a method (300) for providing differential access to a digital document among a plurality of workflow participants (110a-110n), wherein at least one of the plurality of workflow participants is outside of at least one of a common and a uniformly-secure environment, said digital document comprising at least one atomic unit (122a), said one or more computer programs comprising a set of instructions to:
- associate a first set of keys to the at least one atomic unit (304), said first set of keys comprising an encryption key, a signature key, and a verification key;
- encrypt the at least one atomic unit using the encryption key (300);
- sign the encrypted at least one atomic unit using the signature key (308);
- identify a level of access from a plurality of access levels to the at least one atomic unit to be granted to each of the workflow participants (310);
- identify which of the keys in the first set of keys to supply to each of the workflow participants based upon the identified level of access (312);
- supply each of the workflow participants with the identified one or more keys, wherein the encryption key enables reading, the signature key enables modification, and the verification key enables authentication of the at least one atomic unit (314); and
- supply the encrypted and signed at least one atomic unit to a first workflow participant of the plurality of workflow participants (316).

15. The computer readable non-transitory storage medium (410) according to claim 14, wherein supplying each of the workflow participants with the identified one or more keys (314) further comprises a set of instructions to:
- supply the workflow participants identified to be granted a no access level to the at least one atomic unit with the verification key, while excluding the signature key and the encryption key for the at least one atomic unit;
- supply the workflow participants identified to be granted a read only access level to the at least one atomic unit with the encryption key and the verification key, while excluding the signature key for the at least one atomic unit; and
- supply the workflow participants identified to be granted with the modify access level with the encryption key, the signature key, and the verification key for the at least one atomic unit.

* * * * *

UNITED STATES PATENT AND TRADEMARK OFFICE
CERTIFICATE OF CORRECTION

PATENT NO. : 9,444,628 B2  
APPLICATION NO. : 13/810714  
DATED : September 13, 2016  
INVENTOR(S) : Helen Balinsky et al.

Page 1 of 1

It is certified that error appears in the above-identified patent and that said Letters Patent is hereby corrected as shown below:

In the Claims

In Column 11, Line 7, in Claim 1, delete "fire" and insert -- first --, therefor.

In Column 11, Line 64, in Claim 5, delete "work tow" and insert -- workflow --, therefor.

In Column 13, Line 39, in Claim 12, delete "to unit" and insert -- atomic unit --, therefor.

In Column 14, Line 7, in Claim 14, delete "which embedded" and insert -- which is embedded --, therefor.

Signed and Sealed this  
Twenty-first Day of February, 2017

Michelle K. Lee  
*Director of the United States Patent and Trademark Office*